No. 640,748. Patented Jan. 9, 1900.
O. F. CONKLIN.
ELECTRIC MOTOR AND CIRCUIT THEREFOR.
(Application filed Apr. 24, 1899.)
(No Model.)
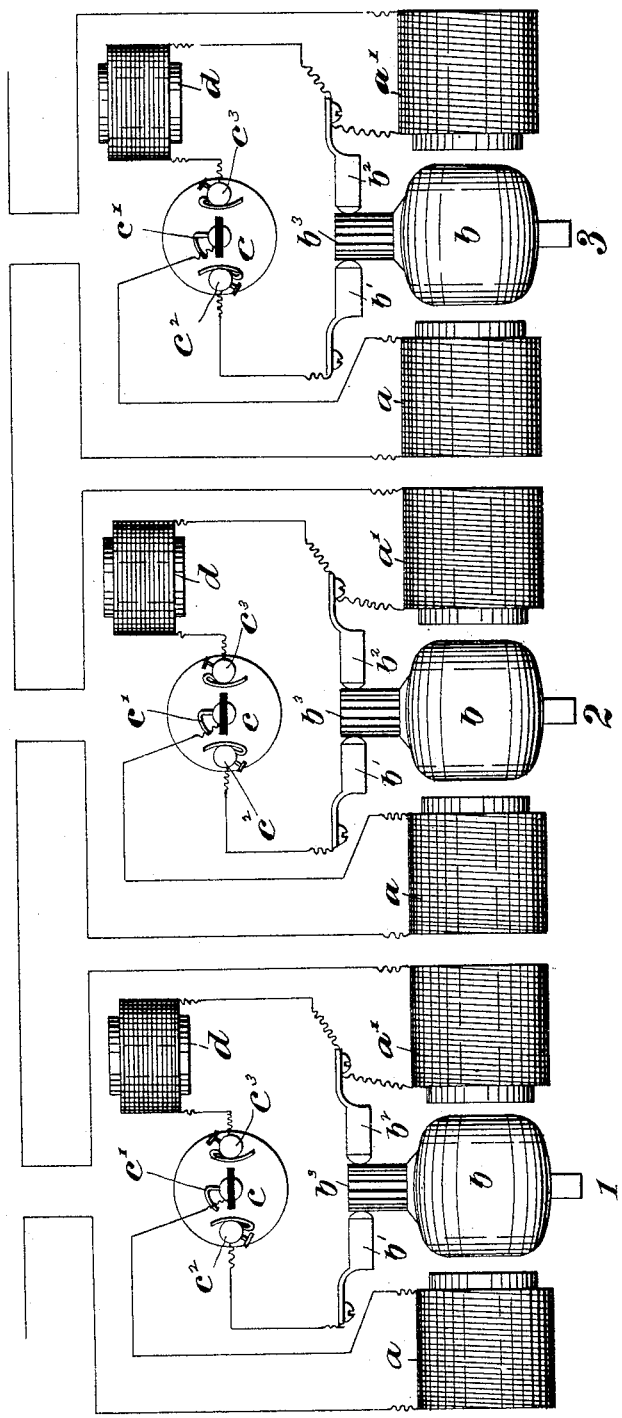

UNITED STATES PATENT OFFICE.

OLIVER F. CONKLIN, OF SPRINGFIELD, OHIO.

ELECTRIC MOTOR AND CIRCUIT THEREFOR.

SPECIFICATION forming part of Letters Patent No. 640,748, dated January 9, 1900.

Application filed April 24, 1899. Serial No. 714,159. (No model.)

*To all whom it may concern:*

Be it known that I, OLIVER F. CONKLIN, a citizen of the United States, residing at Springfield, in the county of Clark and State of Ohio, have invented certain new and useful Improvements in Electric Motors and Circuits Therefor, of which the following is a specification.

My invention relates to improvements in electric motors and electric circuits therefor, the invention being particularly designed for electric fans and similar devices in which a series of motors or equivalent devices are connected in series.

The object of my invention is to provide means whereby one or more electric devices of this character connected together in series can be cut out of a circuit having a constant voltage without affecting the electromotive force as applied to the other devices in the series. I attain this object by the construction shown in the accompanying drawing.

In the drawing, which is a diagram view showing motors connected in series, 1, 2, and 3 represent different stations or motors, each of which in this case is a duplicate of the other. Each of these motors consists of the usual field-magnets $a$ $a'$, the armature $b$, brushes $b'$ $b^2$, and the commutator $b^3$. Included in circuit with the motor thus formed I employ a switch $c$ and a resistance-coil $d$. The switch $c$ might be termed a "three-point" switch, the point $c'$ being connected in the main circuit, the point $c^2$ connected to the brush $b'$, and the point $c^3$ to the resistance-coil $d$. From the brush $b^2$ the circuit divides, one branch going to the field-magnet $a'$ and the other to the resistance-coil $d$.

The resistance-coil $d$ is equal, or substantially so, to the electric impedance of the armature $b$, or, in other words, to the resistance of the armature when the same is in operation. Now the switches $c$ are each so constructed that when turned in the position shown in the drawing the circuit will be absolutely broken and all the motors in the series will be stopped. If turned so that the point $c'$ contacts with $c^2$, then each motor will be in circuit in the usual way and the motors will be simultaneously operated. If one of the switches should be operated so that the point $c'$ contacts with the point $c^3$, then the armature and the brushes will be cut out and the field-coil and the resistance-coil will remain in circuit, and thus compensate for the impedance of the armature in operation while the motor remains at rest. It will be seen that by this construction a number of electrical devices may be connected in series and either one cut out at will without materially changing the resistance of the circuit, and therefore without affecting the electromotive force as applied to the remaining devices in the circuit, the field-magnets always remaining in circuit. This construction is especially designed and applicable to use with electromotor fans, which are usually connected up in series, in groups, and in circuits of a constant voltage, and by the means shown any one or more of the fans may be stopped without interfering with the voltage or electromotive force as applied to the remaining fans in the series. It is obvious, however, that the same constructions may be used with other devices with equal results.

Having thus described my invention, I claim—

1. The combination with a plurality of motors connected in series, the field-coils of which are always in circuit, and a switch for each motor for throwing into and out of the circuit the armature of said motor, and a resistance equal to the impedance of said armature adapted to be thrown in circuit when said armature is thrown out, substantially as and for the purpose specified.

2. The combination with a plurality of electromotors, a switch connected with each of said motors, said switch being located between the field-magnets and the armature of said motor, and a resistance equal to the impedance of said armature also connected to said switch between the field-magnets whereby the armature may be cut out and the resistance cut into said circuit without affecting the field-coils in said circuit, substantially as specified.

3. The combination with a plurality of electric motors connected in series, and a switch connected with each of said motors for cutting out and in the armatures of said motors with the field-coils always in circuit, and a resistance forming a part of and connected to said motors equal to the electric impedance of said armatures and connected to said switch and to the field-coils in such a manner that the said resistance may be included in the circuit with the field-coils when the armature is cut out, substantially as and for the purpose specified.

In testimony whereof I have hereunto set my hand this 19th day of April, A. D. 1899.

OLIVER F. CONKLIN.

Witnesses:
    CHAS. I. WELCH,
    EARL G. WELCH.